United States Patent
Kasson et al.

(12) United States Patent
(10) Patent No.: US 8,298,441 B1
(45) Date of Patent: Oct. 30, 2012

(54) METHOD FOR INCORPORATING WATER SOLUBLE, REACTIVE, PHOSPHORESCENT PIGMENTS INTO A STABLE WATERBORNE COATING THROUGH PH BUFFERING

(75) Inventors: Owen P. Kasson, Cleveland, OH (US); Robert A. Martuch, Parma, OH (US); Celestine O. Ilori, South Euclid, OH (US); Glenn A. Miller, Fairview Park, OH (US); Daniel M. Gerow, Avon, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 565 days.

(21) Appl. No.: 12/125,520

(22) Filed: May 22, 2008

Related U.S. Application Data

(60) Provisional application No. 60/939,536, filed on May 22, 2007.

(51) Int. Cl.
*C09D 5/22* (2006.01)
(52) U.S. Cl. .................. 252/301.36; 524/457; 524/403; 524/437
(58) Field of Classification Search ........... 252/301.4 R, 252/301.36; 524/457, 403, 437
See application file for complete search history.

(56) References Cited

U.S. PATENT DOCUMENTS

| | | | |
|---|---|---|---|
| 5,424,006 A * | 6/1995 | Murayama et al. .... | 252/301.4 R |
| 5,472,737 A | 12/1995 | Anders | |
| 5,665,793 A | 9/1997 | Anders | |
| 5,686,022 A | 11/1997 | Murayama et al. | |
| 5,874,491 A | 2/1999 | Anders | |
| 6,242,043 B1 | 6/2001 | Lipp | |
| 7,183,000 B2 | 2/2007 | Hall et al. | |
| 2003/0134973 A1* | 7/2003 | Chen et al. ..................... | 524/804 |
| 2006/0008912 A1* | 1/2006 | Simon et al. ..................... | 436/5 |
| 2006/0016109 A1* | 1/2006 | Nicolaas ......................... | 40/542 |
| 2007/0096058 A1 | 5/2007 | Hirata et al. | |

* cited by examiner

*Primary Examiner* — Carol M Koslow
(74) *Attorney, Agent, or Firm* — Deron A. Cook; Robert E. McDonald; Eryn Ace Fuhrer

(57) ABSTRACT

Stable, phosphorescent, water-based coating compositions include a latex emulsion, at least one metal aluminate pigment as a source of phosphorescence, and an effective buffering amount of a buffering agent, which may be an organic acid. The ratio of metal aluminum phosphorescent pigment to latex binder in the latex emulsion may be in the range of about 0.5:1 to about 2.0:1. The effective amount of buffering agent may be from about 0.1% to about 10% with respect to emulsion weight. Compositions according to the present invention may have useful shelf lives of six months or longer. Methods of using the phosphorescent latex coatings and coated substrates are also taught.

12 Claims, No Drawings

METHOD FOR INCORPORATING WATER SOLUBLE, REACTIVE, PHOSPHORESCENT PIGMENTS INTO A STABLE WATERBORNE COATING THROUGH PH BUFFERING

This application claims priority from U.S. Provisional Application 60/939,536 filed May 22, 2007, the entirety of which is incorporated herein by reference.

I. BACKGROUND OF THE INVENTION

A. Field of Invention

The present invention relates to phosphorescent paints and coatings and coated articles.

B. Background

Phosphorescent pigments have long been incorporated into paints and plastics as a means of imparting phosphorescent properties to formed products and coated substrates. Though use of phosphorescent pigments has often been relegated to novelty, glow-in-the-dark items, at least one important use of phosphorescing products, namely phosphorescing paints and adhesive tapes, has been for demarcating building exits, egress pathways and potential obstacles to egress, such as stairs, to facilitate building evacuation. Phosphorescent paints and adhesive tapes are particularly desirable for use in these applications because, by them, building exits and egress pathways can remain visible to a departing occupant even in blackout conditions.

Recent large-scale building evacuations following natural and man-made disasters have prompted new consideration of the use of phosphorescent materials for the demarcation of building exits and egress pathways and of the performance characteristics of those materials. This has prompted a need to develop phosphorescent pigments having greater brightness and increased afterglow and to form products with them and methods for using those products that are adapted to maximize the performance characteristics of the enhanced phosphorescent pigments.

There are, at present, essentially two classes of phosphorescent pigment chemistries for use in forming phosphorescent products. Sulfide phosphorescent pigments, which includes compounds such as CaS:Bi, CaStS:Bi, ZnS:Cu, ZnCdS:Cu and the like, have been available for decades. Sulfide phosphorescent pigments, however, are chemically unstable, have a relatively short afterglow, and may contain cadmium. These pigments have been successfully used in forming water based phospholuminescent coatings. Notwithstanding their compatibility with and stability in water-based coatings, these pigments do not have the brightness and afterglow necessary to form water-based coatings that can meet modern performance expectations.

Recently, a new class of phosphorescent pigments has been made commercially available. This class of phosphorescent pigments includes the metal aluminates, particularly alkaline earth aluminate oxides, of the formula $MAl_2O_4$ where M is a metal or mixture of metals. Examples of these metal aluminate pigments include strontium aluminum oxide ($SrAl_2O_4$), calcium aluminum oxide ($CaAl_2O_4$), barium aluminum oxide ($BaAl_2O_4$) and mixtures thereof. The metal aluminate pigments show significantly improved brightness and afterglow in comparison to the sulfide phosphorescent pigments. Thus, they are desirable to use in many applications.

Many alkaline earth aluminate oxides, however, will hydrolyze in the presence of water to form salts. This presents a challenge in using these metal aluminate oxides in water-based coatings. In latex coating compositions, for example, the salts will rapidly destabilize the latex emulsion and increase the pH. The increasing pH leads to further hydrolysis and further destabilization of the emulsion. Destabilization of the latex emulsion is ultimately evidenced by the gelling or irreversible separation of the coating composition and effectively hampers the usefulness of the composition as a coating.

Various approaches have been undertaken to modify metal aluminate pigment particles to make them more stable for use in water-based coatings. Approaches to stabilizing metal aluminate pigment particles have, for example, involved coating the particles with or encapsulating them in a moisture barrier. For example, U.S. Pat. No. 6,242,043 describes firing metal aluminate phosphors in the presence of ammonium fluoride or ammonium diflouride at relatively high temperatures to impart onto the phosphor a moisture impervious coating. Potassium borosilicate glass coated metal aluminate pigment particles are also available and show improved stability in water. U.S. Pat. Nos. 5,665,793 and 5,874,491, each to Anders, teach compositions containing a moisture sensitive luminescent substance, including metal aluminate oxide phosphors, and an epoxy resin or water miscible polyurethane resin. To these compositions, it is taught that an amount of water-based paint may be blended. Without describing a specific mechanism, these patents suggest that the polyurethane or epoxy protects the pigment from being attacked by the moisture in the air and the water in the water based paint composition. No shelf life improvement is noted however.

Despite some indications that treated metal aluminate pigments are more stable in water based coatings, treated metal aluminate pigments are more expensive to use than untreated pigments and can suffer comparatively reduced brightness and afterglow.

It still remains to create a cost-effective, stable, phosphorescent, water-based coating composition that enjoys the benefits of using metal aluminate pigments. Water-based coatings are desirable for their ease of application, durability, and in light of environmental considerations, as water based coatings may be formed having relatively low solvent levels and VOCs. It is particularly desirable to develop water-based coating that incorporate metal aluminate pigments and yet retain a substantial, useful shelf life, during which time the phosphorescence will not substantially degrade. The present invention describes a novel solution for making a phosphorescent, water-based coating that incorporates untreated metal aluminate pigments.

II. SUMMARY OF THE INVENTION

According to the present invention, a water-based phosphorescent coating composition suitable for application to a substrate includes a film-forming latex emulsion, a metal aluminate phosphorescent pigment, and a buffer agent. It is believed that long-term (greater than 6 months, preferably at least one year) stability of the metal aluminate phosphorescent pigment in the latex emulsion can be achieved by means of buffering the composition with the buffer agent, which may be a weak organic acid, to regulate the pH of the latex emulsion and pigment blend within a range of between about 7 and about 10; more desirably, about 8 to about 9.

Compositional stability may be enhanced by the addition of dispersants, such as anionic dispersants.

According to the present invention, a method is disclosed for enhancing the brightness of the water-based phosphorescent coating, which comprises first coating the substrate with a white base-coat, desirably to a hiding thickness of about 2 to 5 mils, and then applying one or more coats of the water-based phosphorescent coatings of the present invention on top of the basecoat.

The present invention further provides a substrate, coated with a water-based phosphorescent coating containing metal aluminate phosphorescent pigment. The invention particularly describes a substrate that, being so coated, provides a brightness, after exposure to 2 footcandles of light for two hours, of at least 30 mcd/m$^2$ at 10 minutes post exposure, at least 7 mcd/m$^2$ at 60 minutes post exposure and at least 5 mcd/m$^2$ at 90 minutes post exposure. Particularly useful substrates include wood, tile, drywall, and concrete surfaces; wall, ceiling, and floor surfaces, and plastic and fabric adhesive-backed tapes.

Still other benefits and advantages of the invention will become apparent to those skilled in the art to which it pertains upon a reading and understanding of the following detailed specification.

III. DETAILED DESCRIPTION OF THE INVENTION

A coating composition comprises a latex emulsion, a metal aluminate pigment, and a buffer agent. The coating compositions may further comprise one or more dispersants. The composition may have a useful shelf life of at least six months, and preferably, one year.

1) Emulsion

A latex emulsion, as defined herein, is a dispersion of natural or synthetic rubber or plastic polymer particles or globules in an aqueous medium. Latex polymer particles are conventionally prepared by means of an emulsion polymerization of monomers and copolymers, such as acrylic and vinyl monomers. Representative, non-limiting examples of such latex polymers include polychloroprene, butyl latex, styrene-butadiene copolymer, polyacrylate polymers and copolymers such as of ethyl acrylate and a suitable alkyl methacrylate, vinyl-acrylic or styrene-acrylic copolymers, vinyl acetate/ethylene copolymers, vinylidene chloride/polyvinyl chloride polymers, vinylidene chloride/butadiene copolymers, vinylidene chloride/polyvinyl chloride/acrylic terpolymers, vinylidene chloride/butadiene/acrylic terpolymers, polyurethane dispersions (PUDs), etc.

Latex emulsions that are stable or capable of being made stable within a pH range of between about 7 and about 10 are particularly desirable in the present invention. This pH range corresponds with the range at which it is believed the hydrolysis of the phosphorescent pigments, described below, can be most effectively controlled to effectuate a useful shelf-life.

Without intending to further limit the types of latex emulsions suitable for use in the present invention, or the method used in creating the latex emulsion, acrylic latex emulsions, styrene-acrylic copolymer latex emulsions, and blends thereof are particularly useful in the present invention. For reasons described in further detail, the acrylic latex emulsion sold under the trade name Rhoplex® MV-23LO commercially available from Rohm and Haas Company, is particularly useful by reason of the free benzoic acid that is in the emulsion. The styrene-acrylic latex emulsions sold as UCAR 461 and 471 commercially available from Dow Chemical are also useful in the present invention. These latexes are stable or can be made stable by addition of conventional stabilizers, in the pH range of between about 7 and about 10.

2) Phosphorescent Pigment

Suitable phosphorescent pigments for use in the present invention will comprise a matrix of a phosphorescent phosphor of the general formula MAl$_2$O$_4$:X wherein M is selected from the group consisting of calcium, strontium, barium, and combinations thereof, and X is at least one activation element suitable for activating MAl$_2$O$_4$. In an alternate embodiment, M may comprise a plurality of metal elements comprised of magnesium and at least one element selected from the group consisting of calcium, strontium, and barium. A phosphorescent phosphor, as is known in the art, is a substance that is capable of luminescence. In one embodiment, the at least one activation element X is europium. In alternative embodiments of the subject invention, the at least one activation element X is selected from the group consisting of europium, lanthanum, cerium, praseodymium, neodymium, samarium, gadolinium, dysprosium, holmium, erbium, thulium, ytterbium, lutetium, tin, bismuth, and combinations thereof. There may also be co-activation elements present.

The most preferred phosphorescent pigment is a strontium aluminate having europium as an activation element, specifically of the formula SrAl2O4:Eu. This phosphorescent pigment is commercially available as LumiNova® G-300 M from Nemoto & Co., Ltd., Tokyo, Japan. This phosphorescent pigment, and others like it, are described in U.S. Pat. No. 5,424,006, the disclosure of which is incorporated herein by reference in its entirety. Alternative phosphorescent pigments are commercially available as Lumilux® SN-F25 from Honeywell Specialty Chemicals.

It is particularly useful and economical to use untreated strontium aluminate phosphorescent pigments, which means, strontium aluminate pigments that have not been pre-treated to enhance or alter water solubility or otherwise pre-dispersed in a polymer solution. Untreated strontium aluminate pigments, such as the LumiNova® and Lumilux® pigments referenced above, are generally commercially available in the form of a powder. The pigment particles may have an average particle size of from 1 to 100 microns, preferably from 5 to 90 microns, more preferably from 15 to 80 microns, and most preferably from about 20 to about 40 microns. It will be understood that the preferred average particle size of the phosphorescent pigment may vary with the film build of the coating system. As such, coating systems with larger film builds can accommodate phosphorescent pigment of a larger average particle size. Notwithstanding, using pigments having a large size relative to the film thickness can result in films having disrupted surfaces caused by the protrusion of pigment particles through the surface. These surface disruptions can facilitate the retention of dirt and stains, and, efforts to wash the surface, may result in a significant removal of pigment particles from the coating, thereby reducing subsequent afterglow.

In a particularly useful embodiment of the subject invention, the metal aluminate pigment may have a peak emission level of from 400 to 700, preferably from 450 to 600, and most preferably from 475 to 575 nm, with peak emission level in the green spectrum, being particularly useful.

When used as the exclusive pigment in the coating composition, the pigment to binder ratio of the composition may be from about 0.1:1 to about 2:1; alternatively, about 0.5:1 to about 1.8:1; alternatively, about 0.8:1 to about 1.3:1. A pigment to binder ratio of about 1.1:1 to about 1.3:1 is particularly useful.

While it is contemplated that other pigments, including conventional color pigments, such as iron oxide, chrome oxide, titanium dioxide, carbon, etc., phosphorescent pigments from the class of sulfide based phosphorescent pigments, or fluorescent pigments, may be used in place of a portion of the metal aluminate pigment, these other pigments may adversely impact the brightness and afterglow characteristics provided by the metal aluminate pigment. Thus, where maximizing brightness and afterglow is desired, it is useful not to incorporate significant amounts of other pigments to the coating composition in place of the metal aluminate pigment. Notwithstanding, such pigments may be stably compatible with metal aluminate pigments and thus, may be added to the coating in place of part of or in addition to the metal aluminate pigment.

3) Buffer Agent

Untreated metal aluminate pigments, when exposed to water, hydrolyze to form salts. When untreated metal aluminate pigments are dispersed into latex emulsions, the useful life of those coating compositions is typically from a few hours to a few days under ambient conditions. Hydrolysis of the metal aluminate pigment leads to salt formation, which is believed to destabilize the latex and increase the pH, leading to further hydrolysis and latex destabilization.

Such compositions will, in the frame of a few hours to a few days, typically show significant viscosity increases (gelling) or practically irreversible separation and settling.

It has been discovered, however, that coating compositions comprising latex emulsions and untreated metal aluminate pigments can be made, having useful shelf-lives (stored at ambient temperature) of more than one year, by buffering the composition to maintain a pH in the range of about 7 to about 10; more preferably about 8 to about 9.

It is believed that by buffering the composition, hydrolysis of the metal aluminate pigment can be limited, thereby preserving emulsion stability, and the pH range of the composition can be maintained, thereby preventing the cycle of increasing compositional pH leading to further hydrolysis of the metal aluminate pigment.

In one embodiment of the invention, therefore, a composition comprising a latex emulsion and metal aluminate pigment, further comprises a buffer agent.

Suitable buffer agents may include solutions that contain either a weak acid and one of its salts or a weak base and one of its salts. Buffer agents having an operative pH buffering range of between about 7 and about 10, and more usefully, about 8 to about 9, may be used. It is believed that hydrolysis of the metal aluminate pigment rapidly increases at around pH 10. Thus, it is desirable to keep the composition at a pH level below about 10 and preferably, below about 9.

An acid buffer agent is particularly useful in the present invention. Suitable acids may include acetic acid, benzoic acid, citric acid, and derivatives and analogs thereof. Other suitable buffer agents may be used with sound chemical judgment.

It is useful to include in the composition, an effective buffering amount of the buffer agent. The term "effective buffering amount" refers to that amount of the buffer agent necessary to substantially maintain the pH of the latex emulsion composition containing metal aluminate pigment (and such other additives as may be optionally present) in the range of about 7 to about 10 for the desirable shelf life of the composition. It will be understood that the amount of buffer agent that constitutes an "effective buffering amount" for a particular composition will depend on the type of buffer agent selected and the amount of metal aluminate pigment in the composition. In one embodiment, the buffering amount of the buffer agent, which may be benzoic acid, may be in the range of between about 0.1% and about 10% with respect to emulsion weight, and in another embodiment, about 0.5% to about 5% and instill a further embodiment, about 1% to 2% based on emulsion weight.

The buffer agent will preferably be added to the composition prior to addition of the metal aluminate pigment or substantially at the same time. It will be desirable to avoid significant delay in adding the buffer agent following addition of metal aluminate pigment to the latex emulsion, as hydrolysis can begin rapidly.

It may be useful, in one variation of the invention, to create a buffered phosphorescent pigment additive that includes the metal aluminate pigment and the buffer agent collectively packaged. The principal components of the buffered phosphorescent pigment additive may both be in powdered form (or crystalline form, which may be crushed to a powder)—for example, powdered strontium aluminate pigment may be mixed with powdered citric acid. Alternatively, the components may be dispersed in a liquid. In this form, the buffered phosphorescent pigment additive could be blended into any suitable water based coating composition, such as a commercially available shelf latex primer, base, or tinted paint, to impart phosphorescent properties to the coating.

4) Other additives

In addition to the latex emulsion, metal aluminate pigment, and buffer agent, coating compositions of the present invention may include one or more additives, such as emulsifiers, surfactants and wetting agents, fillers, extenders, anti-microbial agents, thixotropic agents, light stabilizers, diluents, coalescing agents, and the like. Dispersants, including anionic, cationic and nonionic dispersants may be useful additives. One or more such dispersants may be added to the compositions. A particularly useful dispersant is tetra-potassium pyrophosphate (TKPP). Other useful dispersants, which may be used alone, in combination, or in combination with TKPP, include the class of dispersants known as salts of polyacrylic acid dispersants, commercial examples of which are those sold under the trade name Tamol® (681, 165-A, or 1124), which are all commercially available from Rohm and Haas Company.

The compositions of the present invention are particularly useful for their extended shelf life, despite the general incompatibility of untreated metal aluminate pigments in latex emulsions, and afterglow brightness, which is substantially undiminished during the shelf life.

A) Shelf life

Embodiments of the coating compositions containing a latex emulsion, untreated metal aluminate pigment, and buffering amount of a buffer agent, taught herein may have a useful shelf life of at least 6 months, preferably at least 9 months, and more preferably, at least 12 months. The term "useful shelf life" means that the viscosity of the composition, stored in a conventional container for water based coatings at ambient temperatures will not change by more than 20 Krebs units (KU), and preferably, less than about 15 KU, and more preferably, less than about 10 KU within the shelf-life period, that the latex emulsion and pigment will remain stable (no irreversible settling) during the shelf-life period, and that there will not be a significant decrease in pigment phosphorescent performance. It is contemplated that after the shelf-life period, the coating composition will remain suitable for application to a substrate by means of a conventional applicator, such as a brush, roller, or spray apparatus and that the resultant coating will show substantially undiminished phosphorescent properties over newly mixed compositions.

B) Afterglow Brightness

Afterglow brightness refers to the strength of light emission from a phosphorescent coating at a particular time following exposure of the coating to a selected amount of light. In a particularly preferred embodiment, a coating system comprising a film layer formed from a coating composition of the present invention, will have an afterglow brightness, following exposure to 2 footcandles of light for two hours, of at least 30 mcd/m$^2$ at 10 minutes post exposure, at least 7 mcd/m$^2$ at 60 minutes post exposure and at least 5 mcd/m$^2$ at 90 minutes post exposure. It is to be understood that the afterglow brightness is determined according to ISO 17398:2004 using an A. B. Hagner ERP-105 Luminescence Meter.

It has been discovered that the afterglow brightness of the coating compositions can be enhanced to provide coating systems having afterglow characteristics as described in the previous section, by first coating a substrate with at least one hiding base-coat of a suitable substantially white coating composition, which need not be phosphorescent, and subsequently applying the phosphorescent coating composition of the present invention in one or more layers on top of the base-coat. Without intending to be limiting, a particularly useful white base-coat is Promar 200 Luminous Base commercially available from The Sherwin-Williams Company. The term "hiding" simply refers to a layer that substantially conceals the color of the underlying substrate. The white basecoat may be applied by any conventional means, including brushing, rolling, and spraying. Following drying of the base-coat layer, one or more coats of the phosphoscent composition of the present invention are applied, again by any conventional means, preferably to a total wet film thickness of at least 10 mils, and more preferably, at least 12 mils. Thinner phosphorescent coating layers are possible, but may be anticipated to have more limited afterglow brightness.

Coatings, as described herein, may be suitable for any substrate conventionally coated with latex paints, including, wood, metal, plastic, and cementitious substrates. The coatings may be useful on drywall, architectural tiles, such as ceiling tiles, floor tiles, cement board, and wood paneling, and other cementitious, wood, fabric, plastic, glass, and cloth substrates. One particularly useful application is to coat the non-adhesive side of an adhesive tape with the phosphorescent coating compositions of the present invention, optionally, over a white basecoat layer. Such coated adhesive tapes may be used to demarcate building exits, egress pathways, and obstacles, such as stairs. It may be desirable to paint one or more building walls, floors, or ceilings with the phosphorescent compositions taught herein.

The following examples serve to further elucidate compositions of the present invention and are given to illustrate the invention.

EXAMPLE 1

A phosphorescent latex coating composition according to the formula set forth in Table 1 (identified as CC-1) may be prepared. Rhoplex MV-23LO may be selected as the latex emulsion because it includes benzoic acid, which is identified herein as a buffer agent, in an effective buffering amount. More specifically, an amount of acrylic latex (Rhoplex MV-23LO) may be blended with in a two pot process with all other components except the pigment. The pigment (Luminova G-300M) may be added and mixed at approximately 400 rpm on an air mixer using a propeller blade to minimize shear. Mixing may be done for twenty minutes. All amounts indicated in Table 1 are given in pounds per 100 gallons.

TABLE 1

| Phosphorescent Latex Composition Formula - CC-1 | |
|---|---|
| Rhoplex MV-23LO | 550* |
| Water | 176.4 |
| mineral oil defoamer | 5 |
| Min-U-Gel 400 Clay (available from ITC, Inc.) | 5 |
| Cellulosic thickener QP-4400 HEC (available from Dow) | 3 |
| TKPP | 2 |
| Benzisothiazolone Biocide | 0.5 |
| Tamol 681 Acrylic Resin (available from Rohm & Haas) | 8.5 |
| POE-5 Nonylphenol Triton N-57 (available from Dow) | 5.5 |
| AMP | 2 |
| Nemoto Luminova G-300M | 300 |
| Glycol ether cosolvent Texanol (available from Eastman Chemical) | 20 |
| Polyurethane thickener Acrysol RM-825 (available from Rohm and Haas) | 5 |

*All amounts listed in pounds per 100 gallons

Stability testing

Tests were performed to evaluate the useful shelf life of a composition made according to the formula in Table 1. Accelerated oven stability was used to predict shelf life and long-term shelf life testing at ambient temperatures was conducted. To determine oven stability, ITM #P201 Heat Age Stability, Version 3 was used. Three (3) 6.4 oz samples of coating composition CC-1 were prepared. The samples were mixed for five minutes. Initial KU viscosity was measured.

To test stability, one sample was placed in a 140° F. oven, a second sample was placed in a 120° F. oven, and a third sample was stored at ambient temperature. The samples were periodically stirred and checked for any instability, such as gelling or settling. Testing continued until the sample gelled.

As shown in Table 2, the sample stored at 140° F. gelled after 5 weeks. Notably, however, after three weeks, the KU viscosity had not changed more than 10 units and the pH of the composition was maintained at less than 10. Four-week stability at 140° F. is believed to show correspondence to an estimated shelf life of at least one year. The sample stored at 120° F. survived for 10 weeks before gelling. It is again noted that the pH did not exceed 10 for at least 4 weeks and the KU viscosity did not change more than 10 units during that time. Again the estimated shelf-life based on these data is at least one-year. The sample stored at ambient conditions showed no signs of gelling after one year.

TABLE 2

| | Oven Stability | | | | | | | | |
|---|---|---|---|---|---|---|---|---|---|
| Treatment | Initial pH/KU/ICI | Week 1 pH/KU/ICI | Week 2 pH/KU/ICI | Week 3 pH/KU/ICI | Week 4 pH/KU/ICI | Week 5 pH/KU/ICI | Week 6 pH/KU/ICI | Week 7 pH/KU/ICI | Gelled |
| Ambient | 8.96 120 0.929 | — | — | 9.66 110 0.829 | — | — | — | — | N/A |
| 120° F. | 8.96 120 0.929 | — | 9.7 110 0.754 | — | 9.72 110 0.732 | — | — | — | @ 10 weeks |
| 140° F. | 8.96 120 0.929 | 9.55 109 0.858 | — | 9.6 113 0.804 | — | Gelled | N/A | N/A | @ 5 weeks |

Afterglow testing

A series of afterglow tests were performed on coating composition CC-1. In one test, sections of ¼" thick cement board were primed by roller with one coat of Promar 200 Luminous Base and then top coated by roller with two coats of coating CC-1. The pieces were tested for brightness according to the procedure described in ISO 17398:2004. The panels were then measured for brightness at 10 minutes, 60 minutes and 90 minutes. Results are shown in Table 3.

TABLE 3

Brightness testing results

| Test | Test Method | Brightness |
|---|---|---|
| Brightness | ISO 17398:2004 | 69.1, 13.9, 8.6 mcd/m$^2$* |

*Brightness results represent readings at 10, 60, and 90 minutes respectively

In a second set of tests, brightness testing was performed on both fresh samples, aged samples (five weeks at ambient temperature), and oven-aged samples (five weeks at 120° F.). For these tests, three samples of each were tested and averaged for the brightness rating results. Substrate preparation was as follows: a 4 mil wet basecoat of Promar 200 Luminous Base was drawndown on Lenata 3B Opacity charts with a 4-mil bird bar. The luminescent topcoat was drawndown over the dry basecoat with a 20-mil mudcracking bar. The panels were placed in a dark room for 48 hours, then exposed to 2 footcandles of light for two hours. The panels were then measured for brightness at 10 minutes, 60 minutes and 90 minutes. The following Table 4 lists the results:

TABLE 4

Brightness testing results

| | 10 Minutes | 60 Minutes | 90 Minutes |
|---|---|---|---|
| Fresh | 39.5 mcd/m$^2$ | 10.5 mcd/m$^2$ | 6.7 mcd/m$^2$ |
| Ambient - 5 weeks | 39.5 mcd/m$^2$ | 11.5 mcd/m$^2$ | 7.6 mcd/m$^2$ |
| 120 Oven - 5 weeks | 38.0 mcd/m$^2$ | 11.0 mcd/m$^2$ | 7.4 mcd/m$^2$ |

As can be seen from Table 4 there was no appreciable loss in brightness from the fresh sample to either the five-week ambient or five-week oven sample.

EXAMPLE 2

To demonstrate the ability to buffer and thereby stabilize a latex emulsion (Rhoplex AC-264 latex) known to be generally unstable in combination with metal aluminate pigment, a second series of tests were performed.

Procedure

Two coatings were made using the same lots of raw materials. The control paint (CF) was prepared with no benzoic acid and the test paint (TF) contained 5.5 lbs/100 gal of benzoic acid. The benzoic acid used came in large, solid crystals. Benzoic acid has limited solubility to water, so in order to incorporate sufficient material to act as a buffer the material was added to the grind to break up the large crystals and disperse them. The two paints were processed identically, side-by-side.

TABLE 5

Control Formula (CF)

| Description | Amount (pounds) | Weight % | Amount_GL |
|---|---|---|---|
| Rhoplex AC-264 | 550.00 | 50.75 | 62.36 |
| Defoamer | 2.00 | 0.18 | 0.26 |
| Water | 173.86 | 16.04 | 20.92 |
| Min-U-Gel 400 Attapulgite Clay | 5.00 | 0.46 | 0.25 |
| QP-4400H Hydroxyethyl Cellulos | 3.00 | 0.28 | 0.26 |
| Tetra Potass Pyrophosphte-TKPP | 2.00 | 0.18 | 0.10 |
| Benzisothiazolone Biocide | 0.50 | 0.05 | 0.05 |
| Tamol 165-A | 8.50 | 0.78 | 0.97 |
| Triton CF-10 reduced | 5.50 | 0.51 | 0.62 |
| Defoamer | 2.00 | 0.18 | 0.26 |
| Water | 8.31 | 0.77 | 1.00 |
| Texanol-12-Carbon Ester-Alcoho | 20.00 | 1.85 | 2.53 |
| Drew L475 | 1.00 | 0.09 | 0.13 |
| 2-Amino-2-Methyl-1-Propanol 95 | 2.00 | 0.18 | 0.25 |
| Luminova G-300M SR/DY/EU Aluminate | 300.00 | 27.68 | 10.03 |

TABLE 6

Test Formula (TF)

| Description | Amount (pounds) | Weight % | Amount_GL |
|---|---|---|---|
| Rhoplex AC-264 | 550.00 | 50.70 | 62.36 |
| Defoamer | 2.00 | 0.18 | 0.26 |
| Water | 169.52 | 15.63 | 20.40 |
| Min-U-Gel 400 Attapulgite Clay | 5.00 | 0.46 | 0.25 |
| QP-4400H Hydroxyethyl Cellulos | 3.00 | 0.28 | 0.26 |
| Tetra Potass Pyrophosphte-TKPP | 2.00 | 0.18 | 0.10 |
| Benzisothiazolone Biocide | 0.50 | 0.05 | 0.05 |
| Tamol 165-A | 8.50 | 0.78 | 0.97 |
| Triton CF-10 reduced | 5.50 | 0.51 | 0.62 |
| Defoamer | 2.00 | 0.18 | 0.26 |
| Water | 8.31 | 0.77 | 1.00 |
| Texanol-12-Carbon Ester-Alcoho | 20.00 | 1.84 | 2.53 |
| Benzoic Acid 99% | 5.50 | 0.51 | 0.52 |
| Drew L475 | 1.00 | 0.09 | 0.13 |
| 2-Amino-2-Methyl-1-Propanol 95 | 2.00 | 0.18 | 0.25 |
| Luminova G-300M SR/DY/EU Aluminate | 300.00 | 27.65 | 10.03 |

When completed, the off the mill (OTM) viscosity (KU) and pH of the paints were measured and recorded. Drawdowns were made of both samples at 15 mils wet over a Leneta WB chart for comparative brightness measurements. Both samples were then poured off into half-pint cans at equal volumes for stability testing at 140° F. Samples were checked on a daily basis for gelling and pH drift.

Results

Off the Mill Results:

TABLE 7

OTM Measurements

| | CF | TF |
|---|---|---|
| KU | 94.4 | 90.7 |
| pH | 9.73 | 8.93 |

The addition of benzoic acid to the coating lowered the initial pH 0.8 units.

Heat-aged Results:

After 18 hours at 140° F., the control formula had completely gelled. The test formula remained completely fluid with no noticeable coagulation, settling or syneresis. The pH of the test formula was measured to be 9.50 after 18 hours at 140° F.

This demonstration indicates that the addition of benzoic acid to the coating increased emulsion stability in the presence of strontium aluminate.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A coating composition comprising:
   a latex emulsion;
   a metal aluminate phosphorescent pigment; and
   an effective buffering amount of a buffer agent wherein the buffer agent comprises a weak organic acid.

2. The coating composition of claim 1 wherein the metal aluminate phosphorescent pigment comprises a compound having the formula $MAl_2O_4$ in which M is at least one metal element selected from the group consisting of calcium, strontium and barium or, alternatively, wherein M is a plurality of metal elements comprised of magnesium and at least one element selected form the group consisting of calcium, strontium, and barium.

3. The coating composition of claim 2, wherein the metal aluminate phosphorescent pigment comprises a phosphorescent pigment activator element selected from the group consisting of europium, lanthanum, cerium, praseodymium, neodymium, samarium, gadolinium, dysprosium, holmium, erbium, thulium, ytterbium, lutetium, tin, bismuth, and combinations thereof.

4. The coating composition of claim 1, wherein the organic acid is selected from the group consisting of acetic acid, citric acid, and benzoic acid.

5. The composition of claim 1, wherein the effective buffering amount is in the range of between about 0.1% and about 10% with respect to emulsion weight.

6. The composition of claim 1, wherein the ratio of metal aluminate phosphorescent pigment to latex binder in the latex emulsion is in the range of about 0.1:1 to about 2.0:1.

7. The composition of claim 1 further comprising tetrapotassium pyrophosphate.

8. A coating composition comprising:
   a latex emulsion comprising a binder resin selected from an acrylic resin, a styrene-acrylic resin, and blends thereof;
   a metal aluminate phosphorescent pigment comprising a phosphorescent phosphor of the general formula $MAl_2O_4{:}X$ wherein M is selected from the group consisting of calcium, strontium, barium, and combinations thereof, and X is at least one activation element suitable for activating the $MAl_2O_4$ compound; and
   an effective buffering amount of a buffer agent wherein the buffer agent comprises a weak organic acid.

9. The coating composition of claim, wherein X is selected from the group of elements consisting of europium, lanthanum, cerium, praseodymium, neodymium, samarium, gadolinium, dysprosium, holmium, erbium, thulium, ytterbium, lutetium, tin, bismuth, and combinations thereof.

10. The coating composition of claim 9, wherein the buffer agent comprises a weak organic acid selected from the group consisting of acetic acid, citric acid, benzoic acid and blends thereof.

11. The coating composition of claim 10, further comprising at least one color pigment which is other than a phosphorescent pigment.

12. The composition of claim 8, wherein the ratio of metal aluminate phosphorescent pigment to latex binder in the latex emulsion is in the range of about 0.8:1 to about 1.3:1.

\* \* \* \* \*